Nov. 28, 1950     C. C. DAVENPORT     2,531,411
GAS TURBINE LUBRICATION

Filed Dec. 22, 1947     3 Sheets-Sheet 1

INVENTOR
Charles C. Davenport
BY
A. B. Revis
ATTORNEY

WITNESSES:
John M. Wright
E. H. Lutz

INVENTOR
Charles C. Davenport
BY
A. B. Russi
ATTORNEY

Nov. 28, 1950 — C. C. DAVENPORT — 2,531,411
GAS TURBINE LUBRICATION
Filed Dec. 22, 1947 — 3 Sheets-Sheet 3

WITNESSES:
John W. King
E. H. Lutz

INVENTOR
Charles C. Davenport
BY
ATTORNEY

Patented Nov. 28, 1950

2,531,411

UNITED STATES PATENT OFFICE 2,531,411

GAS TURBINE LUBRICATION

Charles C. Davenport, Swarthmore, Pa., assignor to Westinghouse Electric Corporation, East Pittsburgh, Pa., a corporation of Pennsylvania Application December 22, 1947, Serial No. 793,287

2 Claims. (Cl. 184—6)

This invention relates to gas turbine power plants, and more particulary to a lubricating and cooling system for an aviation gas turbine engine.

The development of gas turbine engines, such as those designed for propulsion of aircraft, has raised new problems with relation to journal construction and the lubrication and cooling of bearings. These problems are exemplified in gas turbine apparatus having turbine and compressor rotors which may be operated at velocities as high as 34,000 R. P. M., and which must be supported in bearings that may be subjected to heat from adjacent combustion zones in which operating temperatures range between 800 and 3000° F. It has been found desirable to equip gas turbine engines of this type with ball or roller bearings, which are light in weight and have structural characteristics facilitating cold starting. Methods of bearing lubrication heretofore employed have not, however, proved practicable under the difficult service conditions to which these bearings are subject. In order to overcome these difficulties, I propose to provide for lubrication and cooling of the bearings of such an engine by supplying fluid under pressure at sufficient velocities to carry lubricant in the form of a mist or mobile film, which can be impinged upon each bearing at a rate such as to promote separation and retention of the lubricant on the bearing, while the fluid under pressure is permitted to exhaust to the atmosphere.

It is, accordingly, a principal object of the invention to provide a novel bearing lubrication and cooling system operative to promote improved performance of a gas turbine power plant under the conditions just described.

Another object of the invention is the provision of an improved lubricating and cooling system for a gas turbine engine comprising means for generating a mist of lubricant and fluid under pressure, distributing communications therefor, and a plurality of nozzles for impinging the mist upon the bearings at a velocity which may approximate 1000 feet per second, together with means for withdrawing vitiated fluid and lubricant from the bearings for discharge to atmosphere adjacent the gas turbine exhaust.

Other objects and advantages of the invention will appear in the following more detailed description thereof, taken in connection with the accompanying drawings, in which.

The present invention, although not limited thereto, is particularly adapted for use with a gas turbine power plant of the type employed on aircraft to drive a propeller or generator, or to supply motive fluid for jet propulsion of the aircraft. Such a plant, briefly, comprises a streamlined tubular casing having mounted axially therein a compressor adjacent the forward or inlet end, a turbine operatively connected thereto and located adjacent the rearward or discharge end, and combustion apparatus disposed between the compressor and turbine. Air compressed by the compressor and heated during passage through the combustion apparatus is expanded through the turbine and discharged through a nozzle provided at the rear of the casing, and may aid in propelling the aircraft.

Figure 1:
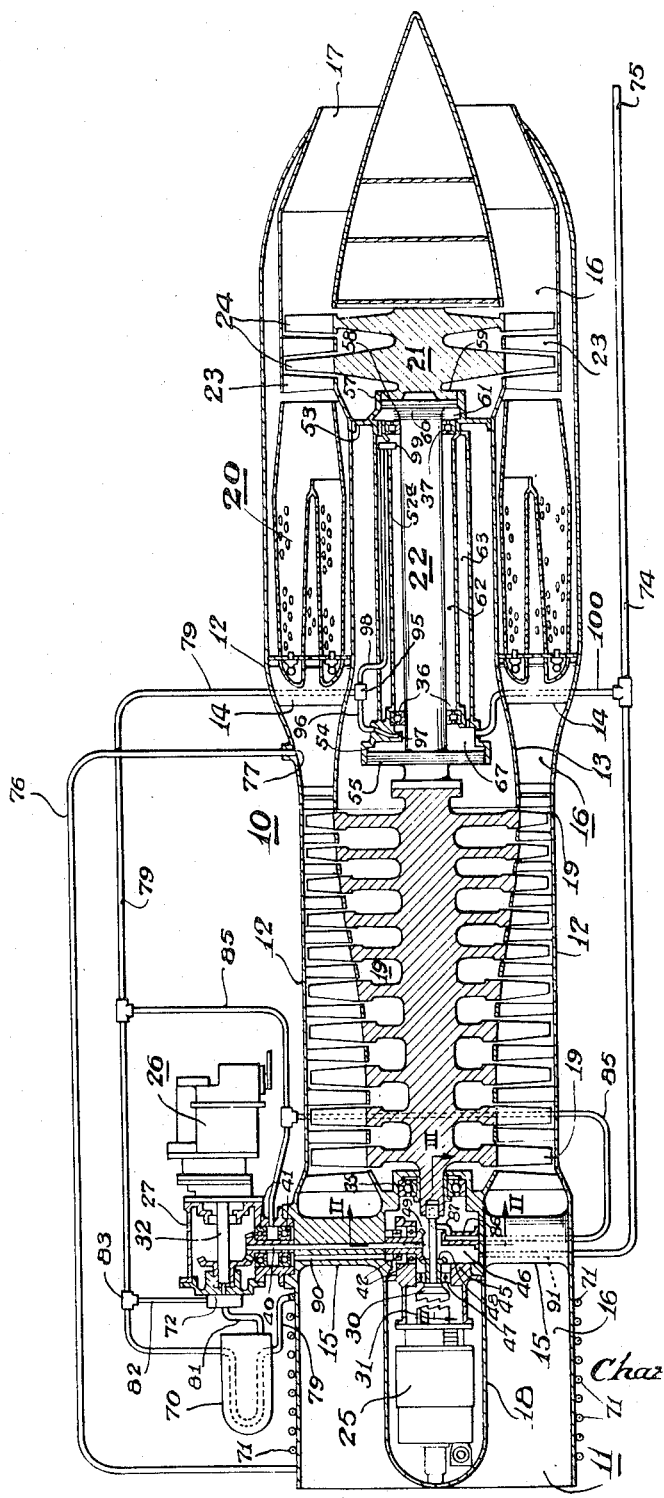
Fig. 1 is a sectional elevational view of a gas turbine power plant equipped with a lubrication and cooling system constructed in accordance with the invention.

Referring now to the drawings more in detail, the gas turbine power plant or engine in the form illustrated in Fig. 1 and indicated generally by the reference character 10 comprises a substantially cylindrical casing structure 12, which is adapted to be mounted in or on the fuselage or wing of an aircraft, with the intake end 11 pointed in the direction of flight. Mounted within the outer casing structure 12 is an inner casing structure 13, which may be supported through the medium of a plurality of radially-disposed strut members such as those designated 14 and 15. The outer and inner casing structures 12 and 13 are adapted to define therebetween an annular duct or passageway 16 extending longitudinally through the engine 10 from the inlet 11 to a rear discharge or jet nozzle 17. Mounted within the casing structure along its longitudinal axis are a fairing core 18 aligned with casing structure 13, an axial-flow compressor, generally indicated by the reference character 19, combustion apparatus 20, and a turbine 21 which is operatively connected to the rotor of the compressor 19 through the medium of a common shaft 22.

The principle of operation of a gas turbine power plant of the type just described is well known and may briefly be outlined as follows: Air enters at the intake 11 and flows through the compressor 19, which delivers the air under increased pressure to the combustion apparatus 20. Fuel is supplied by suitable means (not shown) to the combustion apparatus 20 for heating the compressed air. The hot gases, comprising the products of combustion and excess air heated by the combustion, are discharged from the combustion apparatus 20 at a suitable temperature, which may range between 1000 and 1500° F. and directed by suitable guide vanes or nozzles 23 against the blades 24 of the turbine 21, and are then discharged to the atmosphere through the nozzle 17.

Auxiliary control apparatus for the gas turbine power plant may include a starter mechanism 25 mounted within the fairing cone 18, and a fuel pump 26 carried on a suitable casing section 27 mounted on the outer casing structure 12 of the engine. It is not deemed necessary to disclose in detail the operating elements of these auxiliary devices in connection with the present invention, but it will be understood that the starting device 25 includes an operating shaft 30 and a releasable clutch mechanism 31 which is adapted to be operatively connected to the rotor of the compressor 19, while the fuel pump 26 includes a rotary drive shaft 32 journaled within the casing section 27.

Suitable journal units are provided for rotatably supporting the rotor of compressor 19, shaft 22 and turbine 21, including a thrust bearing assembly 35 mounted in a portion of the casing structure 13 adjacent the struts 15, a roller bearing assembly 36 for supporting the end of the shaft 22 adjacent the compressor, and a similar roller bearing assembly 37 adapted to support the rear end of the shaft 22 adjacent the turbine 21. It will be understood that although each of these bearings is normally subjected to considerable heat during operation of the apparatus, the bearing assembly 37 will be operative in a zone of maximum temperature, by reason of close association of the adjacent end of the shaft 22 with the discs of the turbine 21, where temperatures in excess of 800° F. are usually attained.

Figure 2:
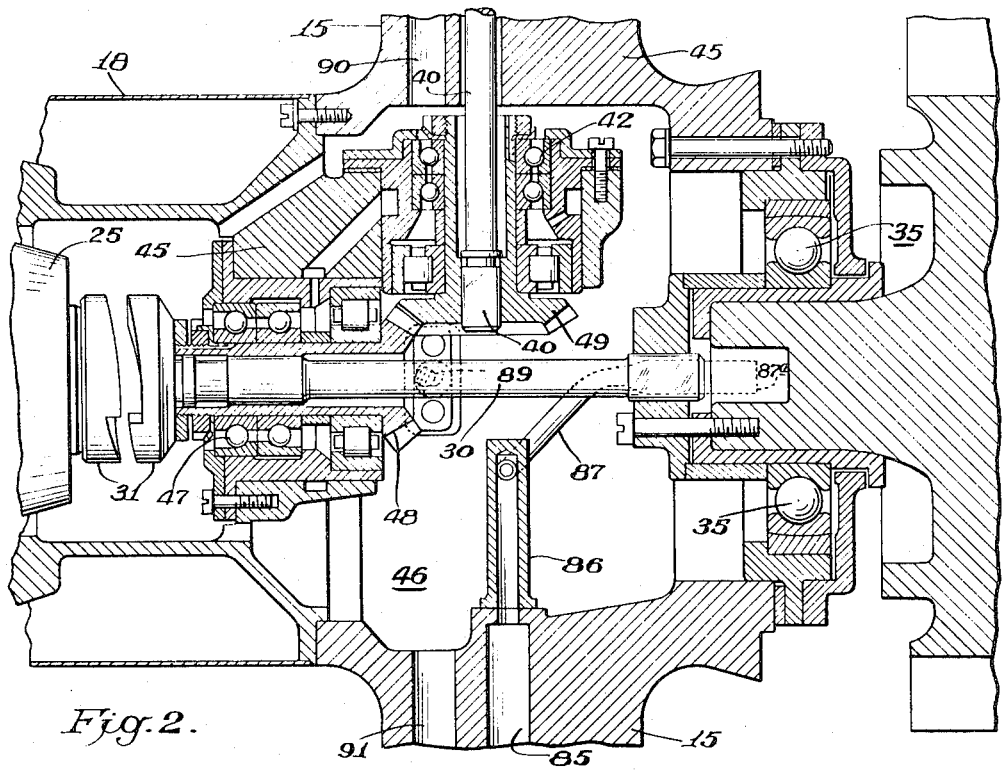
Fig. 2 is an enlarged detail sectional view of a portion of the apparatus, shown in Fig. 1, taken substantially along the line II—II thereof.

Suitable ball bearing assemblies are also provided for the various rotatably-mounted elements of the starter device 25 and fuel pump 26. The shaft 32 of the fuel pump is adapted to be operated through the medium of suitable gearing driven by a laterally-disposed shaft 40, the outer end of which is supported in bearings 41 mounted in the casing section 27 and the inner end of which is journaled in bearings 42 mounted in the casing structure adjacent the fairing cone 18. As best shown in Fig. 2 of the drawings, the bearings 42 are suitably supported on an interior portion 45 of the casing structure enclosing a chamber 46, which structure is also adapted to support suitable ball-bearing assemblies 47 in which is journaled the end of shaft 30 adjacent the clutch mechanism 31. The opposite end of the shaft 30 is adapted to be secured by a spline connection or other suitable means to the rotor of the compressor 19. The shaft 30 carries a gear element 48 which is disposed in cooperative relation with a gear element 49 mounted on the inner end of the shaft 40, for providing an operative connection between the rotor of the compressor 19 and the fuel pump 26, shown in Fig. 1.

Figure 4:
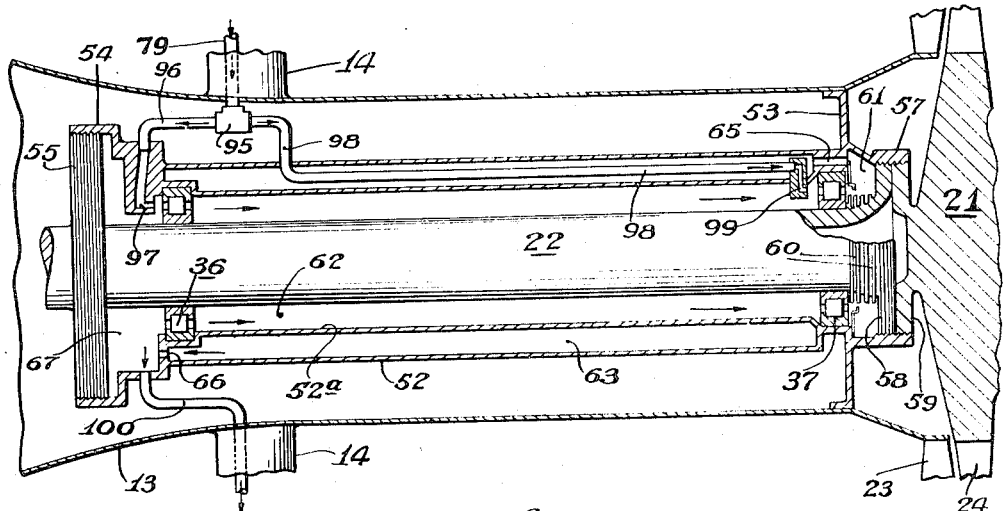
Fig. 4 is an enlarged detail sectional view of the portion of the gas turbine apparatus including the turbine and compressor shaft shown in Fig. 1.

Referring to Fig. 4 of the drawings, the shaft 22 which is interposed between the compressor and the turbine, as already explained, is contained within a generally cylindrical housing 52 that is supported within the inner casing structure 13 by suitable flanges such as the flange 53. At the forward or left-hand end of the housing 52, as viewed in Fig. 4, there is formed an enlarged portion 54 adapted to be disposed in closely spaced surrounding relation with a shielding disc 55 carried by the shaft 22 adjacent the compressor rotor. A similar and somewhat smaller annular portion 57 is provided on the opposite end of the housing 52 adjacent the turbine 21. The shaft 22 is provided with an enlarged extension or annular flange 58, which is disposed rearwardly of the bearing assembly 37 and is adapted to be secured to a complementary flange 59 carried by the adjacent disc of the turbine 21, both the flanges 58 and 59 being disposed within the annular portion 57 of the housing. It will be understood that the clearance between the annular portion 57 of the housing and the assembled flanges 58 and 59 is small, so that the flanges constitute a shield minimizing access of hot gases from the region of the turbine 21 to the interior of the housing 52.

For a purpose hereinafter more fully explained, the portion of the shaft 22 intermediate the bearing 37 and enlarged flange 58 is provided with a plurality of annular cooling fins 60, which are contained within an annular chamber 61 formed interiorly of the portion 57 of the housing. It will be noted that the flange 59 of the turbine disc, the flange 58, and the portion of the shaft 22 carrying the cooling fins 60 constitute a heat-flow path of considerable length between the turbine 21 and the bearing 37, so that the amount of heat normally conducted during operation from the turbine 21 to the bearing 37 will be small enough to render feasible the cooling of the bearing by passing a current of fluid under pressure over the fins 60, as hereinafter explained.

The housing structure 52 further comprises an inner cylindrical wall 52a having formed on the inner side thereof a chamber 62 and at the outer side thereof a chamber 63. The chamber 63 communicates with the chamber 61 by way of one or more ports 65, and also communicates through one or more ports 66 with a chamber 67 that is defined by the housing, the disc portion 55 and the adjacent end of the shaft 22.

According to the invention as illustrated in Fig. 1, the improved lubricating and cooling system, adapted for distribution of lubricant mist under pressure to the bearings of the gas turbine apparatus 10 just described, comprises a fluid lubricant reservoir 70, an air-cooling coil 71 mounted on the cylindrical forward portion of the casing structure 12 surrounding the inlet 11, a lubricant gear pump 72 mounted on the casing section 27 and adapted to be driven by means of the shaft 32, and one or more exhaust conduits 74 each having a discharge end 75 opening adjacent the turbine discharge nozzle 17. For supplying fluid under pressure for operation of the lubrication system, there is provided a conduit 76 which communicates by way of a port 77, formed in the casing structure 12, with the passageway 16 adjacent the discharge end of the compressor 19. The forward end of the conduit 76 communicates with one end of the cooling coil 71, the opposite end of which communicates through a conduit 79, a portion of which may be mounted in heat exchange relation within the lubricant reservoir 70, with branch conduits 85, 96 and 98 which lead to the various bearings of the engine 10. For supplying lubricant to the conduit 79 there is provided an intake conduit 81 communicating with the lower portion of the reservoir 70 and with the intake of the pump 72, and a discharge conduit 82 leading from the discharge end of the pump to the conduit 79 by way of a suitable fixture 83. Communicating with the conduit 79 at a point beyond the fixture 83, the branch conduit 85 leads to suitable nozzles associated with the bearing assemblies 41 within the casing structure 27, and also communicates with a pair of nozzles 87 by way of a fitting 86 within the portion 45 of the casing structure.

Figure 3:
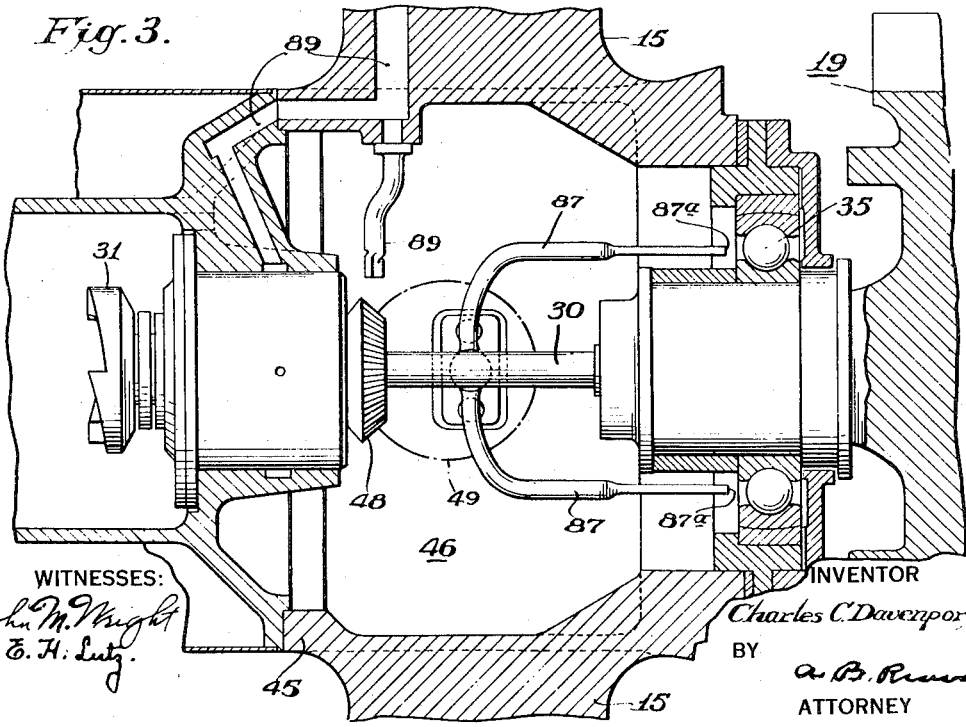
Fig. 3 is a fragmentary enlarged detail sectional view taken substantially along the line III—III of Fig. 1.

Referring now to Figs. 2 and 3 in the drawings, it will be seen that the nozzles 87 terminate in flattened open ends 87a in close proximity to opposite sides of the ball-bearing assembly 35 and are thus adapted to direct jets of lubricant mist against surfaces thereof. Similar jets of lubricant mist may be supplied to the gear elements 48 and 49, and to the bearing assemblies 47, by way of supply communications and nozzles 89, which may be suitably connected to the main supply communications 85 already mentioned. For discharging vitiated fluid under pressure and lubricant from the bearings 41, there is provided a discharge conduit 90 which leads from the space occupied by these bearings to the chamber 46. A similar discharge passageway 91 is formed within the lowermost struts 15 for conducting fluid under pressure and excess lubricant from the chamber 46 to the exhaust conduit 74.

Referring again to Fig. 4, the lubricant mist-supply conduit 79 communicates by way of a T-fitting 95 and branch conduit 96 with a nozzle 97 adjacent the bearing assembly 36, and by way of branch conduit 98 with a similar nozzle 99 disposed in closely spaced relation with the bearing assembly 37. Communicating with the lowermost portion of the chamber 67 is a discharge conduit 100, as shown in Fig. 1, which leads to the discharge conduit 74.

In operation, air compressed by the compressor 19 passes from the duct 16 through the conduit 76, cooling coil 71 and conduit 79 to the fitting 83, at which point lubricant supplied from the reservoir 70 by operation of the lubricant pump 72 is forcibly mixed with the stream of compressed air, which then continues to flow through the conduit 79, carrying with it quantities of lubricant either in the form of a mist or as a film moving along the inner surface of the conduit. From the conduit 79 part of the lubricant mist is delivered by way of the conduit 85 to the bearing assembly 41 and bearing assembly 35, while another part of the lubricant mist is carried through the conduits 96 and 98 to the shaft bearings 36 and 37.

By reason of the relatively high pressure of air delivered by the compressor 19, which may be on the order of 50 or 60 pounds per square inch, and by reason of the proportioning of the various conduits and nozzles, including the nozzles 87, 97 and 99, the resultant jets of lubricant mist are impinged against the respective exhaust bearing assemblies and other rotating parts at extremely high velocities, which may approach 1000 feet per second. Referring to Fig. 3, for example, the nozzles 87 will be seen to converge at the open ends 87a adjacent the bearing assembly 35, so that air under pressure passing through these nozzles will have sufficient velocity to carry lubricant from the sides of the nozzles in the form of a fine mist. This mist both cools and lubricates the bearing assembly 35, and at the same time, the resultant violent change in direction of the flow of the fluid under pressure, due to impingement against the parts of the bearing assembly, effects separation of the suspended particles of lubricant from the air stream, so that most of the lubricant is retained on the bearing assembly. Fluid under pressure and any excess lubricant is then withdrawn from the chamber 46 by way of the discharge passageway 91 and exhaust conduit 74.

Fluid under pressure and lubricant mist are similarly discharged at high velocity from the nozzles 97 and 99, shown in Fig. 4, for cooling and lubricating the bearing assemblies 36 and 37. Fluid under pressure and excess lubricant, after impingement on the bearing assembly 36, may flow therefrom by way of the chamber 67 and conduit 100 to the discharge conduit. At the same time, fluid under pressure passing through the elements of bearing assembly 37 flows through the chamber 61, passage 65, chamber 63 and passage 66 to the chamber 67, it being understood that in flowing over the cooling fins 60, the stream of fluid under pressure assists in dissipating heat from the adjacent end of the shaft 22 to protect the bearing assembly 37. By reason of the fact that the discharge end 75 of the exhaust conduit 74 is disposed at or adjacent the jet or turbine exhaust 17 of the gas turbine power plant, there will be a tendency to create suction within the discharge conduit, to aid in the constant withdrawal of spent fluid under pressure and lubricant from the various bearings.

Figure 5:
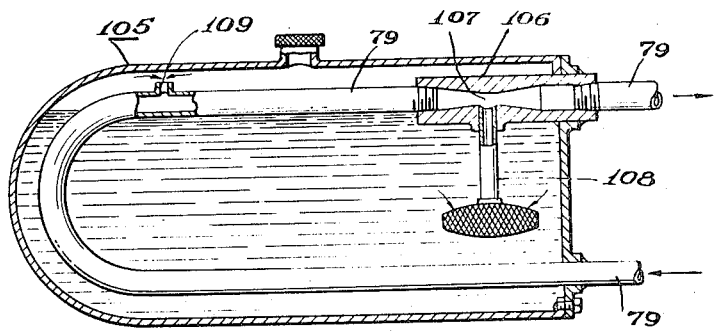
Fig. 5 is an elevational sectional view of a lubricant-supply reservoir constructed in a form differing from that of the supply reservoir included in the apparatus shown in Fig. 1.

If desired, a somewhat different form of lubricant reservoir may be substituted for the reservoir 70, shown in Fig. 1. Referring to Fig. 5, there is illustrated, in diagrammatic form, a lubricant reservoir 105 through which the conduit 79 is adapted to extend. Interposed in the conduit 79 is a fitting 106 having a Venturi passage 107 of reduced flow area. Communicating with the Venturi passage 107, is an intake tube and filter 108 through which lubricant is drawn from the reservoir into a stream of fluid under pressure passing through the conduit 79. For assisting in the entraining of lubricant in the stream of fluid under pressure in the conduit 79, a small orifice or choke passage 109 may be provided in the conduit 79, for subjecting the lubricant within the reservoir 105 to fluid pressure. It will be understood that by utilizing the combined reservoir and lubricant pick-up device shown in Fig. 5, the lubricant pump 72, shown in Fig. 1, may be eliminated from the system. Operation of the lubricating and cooling system employing the modified reservoir 105 will be substantially like that already explained.

From the foregoing, it will now be apparent that a lubricating and cooling system constructed in accordance with the invention may be readily installed in a gas turbine power plant for insuring an adequate supply of lubricant to the various bearing assemblies thereof, without unduly burdening the apparatus with complex and heavy auxiliary mechanisms. The use of ball or roller bearings in association with the improved lubrication and cooling system, makes feasible the consumption of relatively small quantities of lubricant, the excess portion of which may economically be expended into the turbine exhaust, thereby avoiding the need for extra scavenging pumps and closed system piping. Furthermore, by utilizing compressed air supplied by the compressor of the gas turbine apparatus, a constant supply of fluid under pressure is provided at a temperature sufficiently high to prevent congealing of the lubricant.

While the invention has been shown in several forms, it will be obvious to those skilled in the art that it is not so limited, but is susceptible of various other changes and modifications without departing from the spirit thereof.

What is claimed is:

1. A lubricating and cooling system for bearings of a gas turbine power plant including a compressor and turbine exhaust nozzle, said system comprising lubricant supply means including pump, conduit means for entraining lubricant therefrom in a high velocity stream of air compressed by said compressor, a plurality of discharge nozzles communicating with said conduit means for ejecting air under pressure and entrained lubricant into said bearings, and suction communications opening adjacent said turbine exhaust nozzle for withdrawing expelled lubricant and air under pressure from said bearings.

2. A lubricating and cooling system for bearings of a gas turbine power plant including a compressor and turbine exhaust nozzle, said system comprising lubricant supply means including pump, conduit means for entraining lubricant therefrom in a high velocity stream of air compressed by said compressor, a plurality of discharge nozzles communicating with said conduit means for ejecting air under pressure and entrained lubricant into said bearings, and scavenging means including communications opening exteriorly of said power plant for withdrawing expelled lubricant and air under pressure from said bearings.

CHARLES C. DAVENPORT.

REFERENCES CITED

The following references are of record in the file of this patent:

UNITED STATES PATENTS

| Number | Name | Date |
| --- | --- | --- |
| 2,334,942 | Malone | Nov. 23, 1943 |
| 2,367,721 | Gothberg | Jan. 23, 1945 |
| 2,402,467 | Thompson | June 18, 1946 |
| 2,435,990 | Weiler | Feb. 17, 1948 |
| 2,439,273 | Silvester | Apr. 6, 1948 |
| 2,445,114 | Halford | July 13, 1948 |